United States Patent [19]

Shannon

[11] Patent Number: 5,568,608
[45] Date of Patent: Oct. 22, 1996

[54] METHOD FOR PROTECTING DATA IN MEDIA RECORDING PERIPHERAL DEVICES

[75] Inventor: Charles P. Shannon, Garland, Tex.

[73] Assignee: E-Systems, Inc., Dallas, Tex.

[21] Appl. No.: 434,031

[22] Filed: May 3, 1995

Related U.S. Application Data

[63] Continuation of Ser. No. 990,271, Dec. 14, 1992, abandoned.

[51] Int. Cl.⁶ ............................................. G06F 11/00
[52] U.S. Cl. ........................... 395/183.2; 395/182.03; 395/183.18
[58] Field of Search ......................... 395/183.2, 183.16, 395/182.22, 182.21, 182.08, 182.03, 183.18

[56] References Cited

U.S. PATENT DOCUMENTS

| | | | |
|---|---|---|---|
| 4,053,752 | 10/1977 | DeJohn et al. | 364/200 |
| 4,106,092 | 8/1978 | Millers, II | 364/200 |
| 4,155,117 | 5/1979 | Mitchell, Jr. et al. | 364/200 |
| 4,371,754 | 2/1983 | De et al. | 395/182.08 |
| 4,374,415 | 2/1983 | Cormier et al. | 364/200 |
| 4,410,991 | 10/1983 | Lenart | 371/12 |
| 4,538,265 | 8/1985 | Day et al. | 395/182.15 |
| 4,542,457 | 9/1985 | Mortensen et al. | 395/575 |
| 4,600,990 | 7/1986 | Gershenson et al. | 364/200 |
| 4,641,305 | 2/1987 | Joyce et al. | 371/12 |
| 4,740,969 | 4/1988 | Fremont | 371/12 |
| 4,745,602 | 5/1988 | Morrell | 371/16.4 |
| 4,831,622 | 5/1989 | Porter et al. | 395/182.03 |
| 4,837,675 | 6/1989 | Bean et al. | 395/182.03 |
| 4,870,638 | 9/1989 | Kawano et al. | 371/7 |
| 4,885,683 | 12/1989 | Coogan | 364/200 |
| 4,901,232 | 2/1990 | Harrington et al. | 395/575 |
| 4,920,479 | 4/1990 | Hashiguchi | 364/200 |
| 4,959,772 | 9/1990 | Smith et al. | 364/200 |
| 4,992,928 | 2/1991 | Ishihara et al. | 371/7 |
| 5,001,625 | 3/1991 | Thomas et al. | 364/200 |
| 5,003,458 | 3/1991 | Yamaguchi et al. | 364/200 |
| 5,022,027 | 6/1991 | Rosario | 371/12 |
| 5,056,091 | 10/1991 | Hunt | 371/12 |
| 5,159,671 | 10/1992 | Iwami | 371/10.1 |
| 5,168,564 | 12/1992 | Barlow et al. | 371/12 |
| 5,170,397 | 12/1992 | Hurtz et al. | 371/16.4 |
| 5,175,735 | 12/1992 | Dahlby et al. | 371/16.4 |
| 5,210,758 | 5/1993 | Gomez | 371/16.1 |
| 5,212,785 | 5/1993 | Powers et al. | 395/182.03 |
| 5,253,360 | 10/1993 | Hayashi | 371/12 |
| 5,271,013 | 12/1993 | Gleeson | 371/12 |
| 5,313,612 | 5/1994 | Satoh et al. | 395/182.03 |
| 5,327,531 | 7/1994 | Bealkowski et al. | 371/12 |
| 5,373,349 | 12/1994 | Ito | 371/16.4 |

OTHER PUBLICATIONS

Intel "The MCS–80/85 Family User's Manual" 1986 pp. 6–58 to 6–59.

Primary Examiner—Robert W. Beausoliel, Jr.
Assistant Examiner—Joseph E. Palys
Attorney, Agent, or Firm—Harold E. Meier

[57] ABSTRACT

A method for minimizing the loss of data within a data buffer of a peripheral device connected to a host computer upon detection of an error. The peripheral device detects the error condition and terminates the presently executing command. The peripheral device suspends internal operations upon detection of the error and notifies the host computer of the suspension of operations. Operations may continue when the host computer issues a priority abort command to the peripheral device to remove it from the suspended state.

16 Claims, 4 Drawing Sheets

METHOD FOR PROTECTING DATA IN MEDIA RECORDING PERIPHERAL DEVICES

This application is a continuation of application Ser. No. 07/990,271 filed on Dec. 14, 1992, now abandoned.

TECHNICAL FIELD

This invention relates to peripheral devices, and more specifically, to a method for suspending internal operations of the peripheral device when a command error is detected by the peripheral device.

BACKGROUND OF THE INVENTION

During operations of a host computer and a peripheral device, error conditions arise between the host computer and the peripheral device. When this error condition occurs, there is a possibility that user data, typically stored in a data buffer, will be lost if operations are continued during the error condition. Previous methods of dealing with this problem have focused on correcting the error within the host computer.

The intelligent peripheral interface [IPI] device generic command for magnetic and optical disc drives, otherwise identified as ANSI X3.132-1987, defines a sequence known as command chaining. The purpose of command chaining is to protect user data in a data buffer when an error condition is detected by a peripheral recording device.

The command chaining sequence enables a host computer to logically link a series of commands. Thus, when a command in the chain is unsuccessful, the next command cannot be executed. This causes the command chain to terminate and the remaining commands in the chain are not executed. The termination of the command chain prevents the execution of the next command in the command queue allowing the host computer to initiate an error recovery algorithm for the unsuccessful command.

The command chaining sequence places the responsibility on the host computer to logically link the series of commands and to incorporate an error recovery algorithm for any terminated commands. This method puts additional burdens on the host computer by forcing it to maintain the processing capability to logically link the command strings and to store the error recovery algorithm.

Thus, a need has arisen for a method for preventing the loss of user data from the buffers of a peripheral recording device when an error is detected by the peripheral device; where the method does not require additional processing capabilities of the host computer to be used.

SUMMARY OF THE INVENTION

The present invention overcomes the foregoing and other associated problems by using a suspended state condition for the peripheral device. The method protects information within the data buffer of a peripheral device connected to a host computer. When such an error is detected, the command causing the error is terminated and all internal operations of the peripheral device are suspended. After the suspension of operations within the peripheral device, the host computer is notified of the occurrence of the error and of the suspended state condition of the peripheral device. Information may then be recovered from the data buffers of the peripheral device and a command issued by the host computer discontinuing the suspension of operations in the peripheral device.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION OF THE INVENTION

Figure 1:
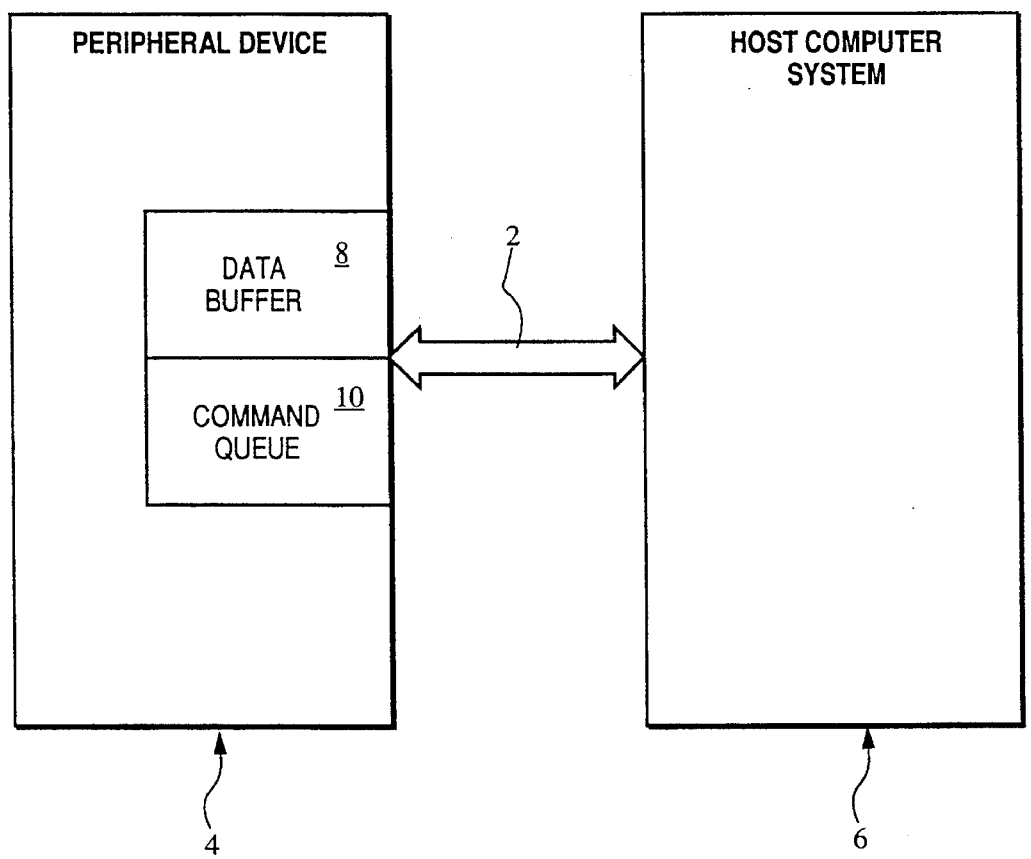
FIG. 1 is a block diagram of a system utilizing the suspended state of the present invention.

Referring now to the drawings and more particularly to FIG. 1, there is shown a block diagram of a system for completing the suspended state operation of the present invention. Data is transferred during read and write operations over a data bus 2 passing between a peripheral device 4 and a host computer 6. The peripheral device 4 contains a data buffer 8 and a command queue 10. The data buffer 8 stores the data received or sent over the data bus 2. The data buffer 8 contains the data protected by the suspended state operation of the present invention. The command queue 10 contains a list of commands controlling the read and write operations of the peripheral device 4.

Figure 2:
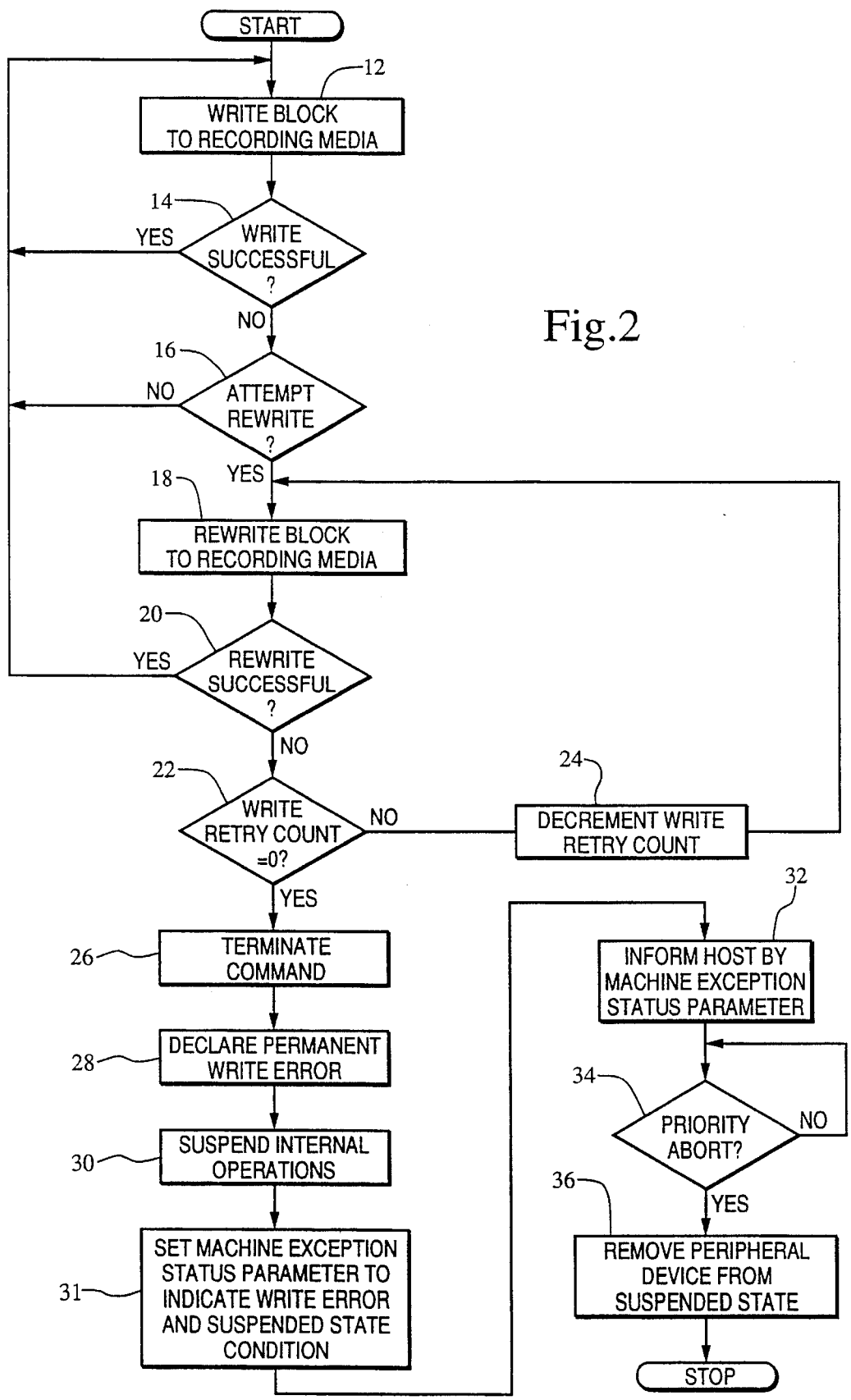
FIG. 2 is a flow chart illustrating the operation of the suspended state for a write command error.

There are several types of errors which cause the peripheral device 4 to enter the suspended state. One of these is an error occurring during a write command as will be described with reference to FIG. 2. With reference to FIG. 2, the peripheral device 4 attempts to write a block of data from the data buffer 8 to the recording media at step 12. If the inquiry step 14 determines that the block of data was successfully written to the recording media, the peripheral device 4 then returns to step 12 and writes the next block of data from the data buffer to the recording media. If the write operation was not successful, the peripheral device 4 determines whether another write operation is required at inquiry step 16.

If the peripheral device 4 is not required to attempt another write operation for the block of data, it returns to step 12 and attempts to write the next block of data. Otherwise, the peripheral device 4 attempts to rewrite the previous block of data at step 18. A further inquiry at step 20 determines if the rewrite was successful. If so, the peripheral device 4 returns to step 12. If the rewrite was unsuccessful, the present write retry is checked at retry count inquiry step 22. If the retry count is not equal to zero, the write retry count is decremented by one at step 24 and the peripheral device 4 attempts another write operation on the block of data at step 18. When the write retry count of step 22 equals zero, the peripheral device 4 terminates the write command at step 26 and declares a permanent write error at step 28.

The peripheral device 4 then suspends internal operation at step 30. The suspension of operations by the peripheral device 4 prevents the execution of the next command in the command queue 10 and protects the integrity of data in the data buffer 8. Next, the peripheral device 4 sets, at step 31, the machine exception status parameter to indicate the existence of a write error and the suspended state condition of the peripheral device. The peripheral device 4 then notifies the host computer 6 of the write error and its suspended state status by a machine exception status parameter at step 32. The machine exception status parameter is a data parameter to inform the host computer 6 of a condition causing the peripheral device 4 to terminate a command.

The peripheral device 4 remains in the suspended state and makes an inquiry at step 34 to determine if the host computer 6 has issued a priority abort command. The priority abort command terminates all queued commands within the peripheral device 4 and removes the device from the suspended state at step 36. The peripheral device 4 will return to active status and carry out the next command it receives. If a priority abort command has not been issued, the peripheral device remains in the suspended state and continues to monitor for a priority abort command at step 34.

It should be noted that the peripheral device 4 may also be removed from the suspended state by issuing a slave reset, a logical interface reset or a recording device reset command. However, these commands will invalidate all data in the data buffer 8. Thus, when data integrity must be preserved, the priority abort command is used.

Figure 3:
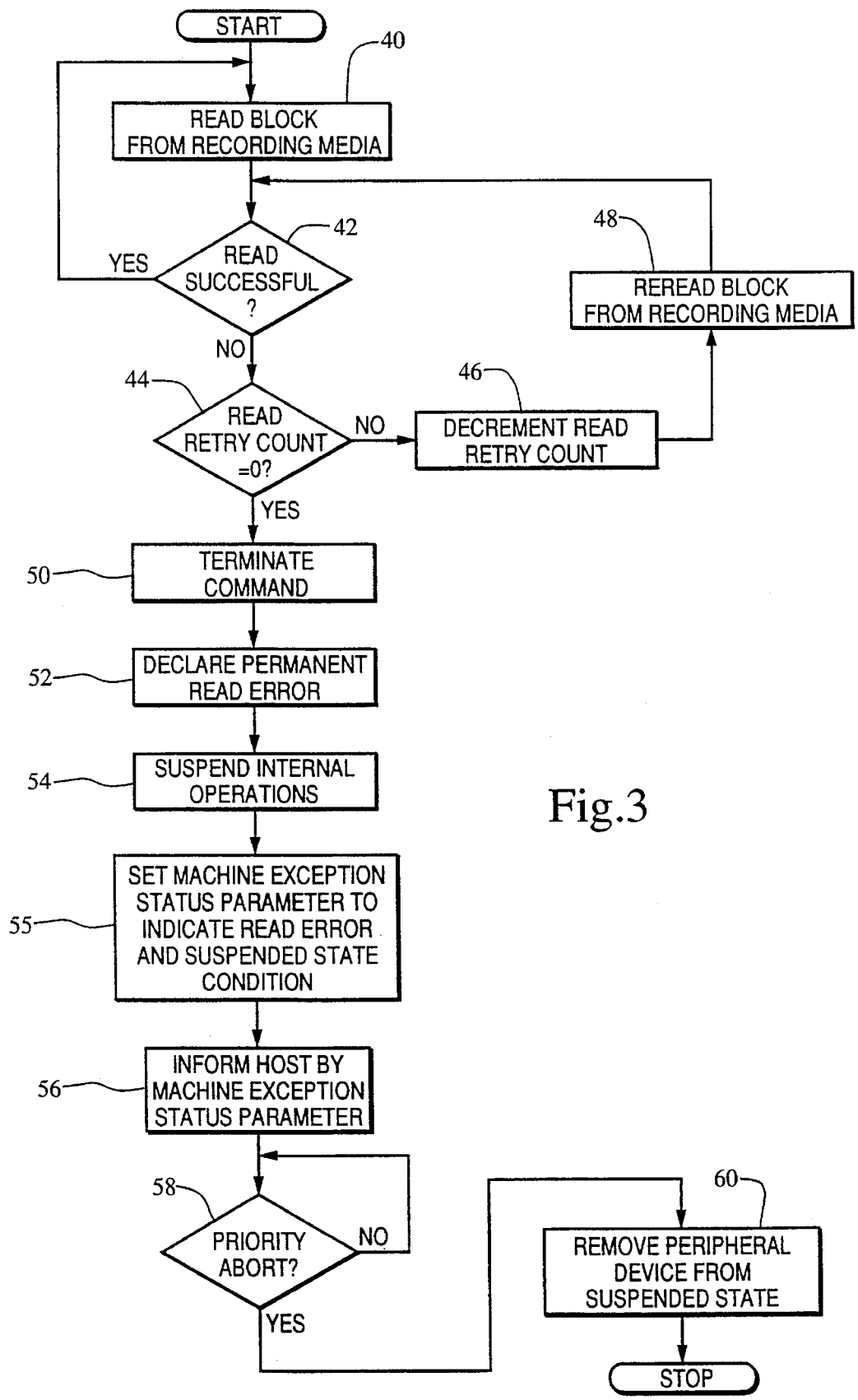
FIG. 3 is a flow chart illustrating the operation of the suspended state for a read command error.

The peripheral device 4 may also enter the suspended state due to an error occurring during a read operation as described in FIG. 3. Referring to FIG. 3, the peripheral device 4 attempts to read a block of data from the recording media at step 40. If it is determined at step 42 that the data block was successfully read, the peripheral device 4 returns to step 40 to read the next block of data from the recording media. If the read operation is unsuccessful, the peripheral device 4 makes an inquiry at step 44 to determine if the read retry count is equal to zero.

If the read retry count is not equal to zero, the count is decremented by one at step 46 and the peripheral device 4 attempts to re-read the block at step 48. If the read retry count is equal to zero, the read command is terminated at step 50 and a permanent read error is declared at step 52.

The peripheral device 4 next suspends internal operation at step 54. The suspension of operations by the peripheral device 4 prevents the execution of the next command in the command queue 10 and protects the integrity of the data in the buffer 8. The machine exception status parameter is set at step 55 to indicate the existence of a read error and the suspended state of the peripheral device. The peripheral device 4 notifies the host computer 6 of the permanent read error and its suspended state status by transmission of a machine exception status parameter at step 56.

The peripheral device 4 remains in the suspended state and makes an inquiry at step 58 to determine if the host computer 6 has issued a priority abort command. The priority abort command terminates all commands in the command queue 10 of the peripheral device 4 and removes the device from the suspended state at step 60. The peripheral device 4 then returns to active status to carry out the next command it receives. If a priority abort command has not been issued, the peripheral device 4 remains in the suspended state and continues to monitor for a priority abort command at step 58. As mentioned before, the slave reset, the logical interface reset and the recording device reset command may also remove the peripheral device from the suspended state.

Figure 4:
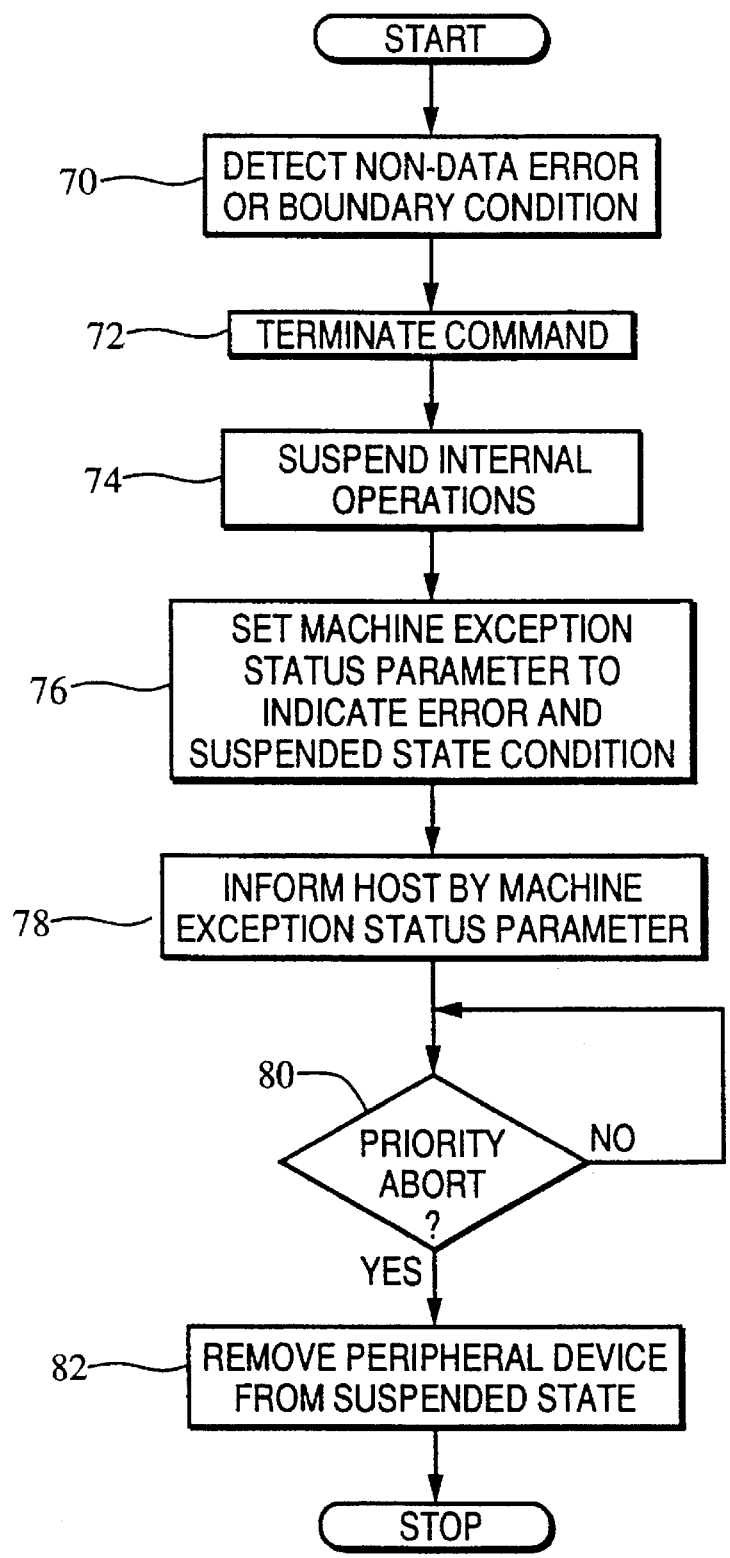
FIG. 4 is a flow chart illustrating the operation of the suspended state for the detection of a non-data error or a boundary condition.

Referring now to FIG. 4, the peripheral device 4 will enter the suspended state condition when a non-data error or a boundary condition is detected. When a non-data error or a boundary condition is detected at step 70, the presently executing command terminates at step 72 and the peripheral device 4 suspends all internal operations at step 74. The machine exception status parameter is set at step 76 to identify the error and identify that the peripheral device 4 has entered the suspended state. At step 78, the host computer 6 is informed of the condition of the peripheral device 4 by the machine exception status parameter. If the peripheral device 4 determines at inquiry step 80 that a priority abort command has been received, the device is removed from the suspended state at step 82. Otherwise, the peripheral device 4 continues to monitor at step 80 for a priority abort command.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

What is claimed:

1. A method for suspending the operation of a media recording peripheral device to minimize the loss of data stored in a data buffer of the peripheral device upon detection of an error condition at the peripheral device, comprising the steps of:

detecting at the peripheral device an error condition;

terminating by the peripheral device execution of a present command within a command queue of the peripheral device;

suspending execution by the peripheral device of commands within the command queue of the peripheral device to preserve data presently stored within the data buffer of the peripheral device;

transmitting a notification from the peripheral device to a host computer of suspension of the execution of commands by the peripheral device within the command queue of the peripheral device;

transmitting an abort command from the host computer to the peripheral device in response to said notification;

in response to said abort command from said host computer, deleting all queued commands within the command queue; and actuating the execution by the peripheral device of commands in the command queue in response to commands received by the peripheral device from the host computer subsequent to deletion of all queued commands.

2. The method of claim 1 wherein the step of detecting an error condition further comprises the step of detecting at the peripheral device a write error.

3. The method of claim 1 wherein the step of detecting an error condition further comprises the step of detecting at the peripheral device a read error.

4. The method of claim 1 wherein the step of detecting an error condition further comprises the step of detecting at the peripheral device a non-data error.

5. The method of claim 1 wherein the step of detecting an error condition further comprises the step of detecting at the peripheral device a boundary condition.

6. The method of claim 1 further comprising the step of transmitting a notification to the host computer of the detection of the error condition by the peripheral device.

7. The method of claim 1 wherein the step of actuating further comprises the step of issuing a priority abort command from the host computer to the peripheral device.

8. The method of claim 1 further comprising the step of recovering data from a data buffer in the peripheral device.

9. A method for suspending the operation of a media recording peripheral device to preserve the integrity of data within a data buffer of the peripheral device having a command queue when the peripheral device fails to execute a command within the command queue comprising the steps of:

detecting at the peripheral device a failure to execute a command within the command queue of the peripheral device;

terminating by the peripheral device execution of the command within the command queue of the peripheral device;

suspending by the peripheral device execution of other commands within the command queue of the peripheral device;

transmitting a notification from the peripheral device to a host computer of the detection of the failure to execute a command within the command queue and the suspension of execution of commands within the command queue of the peripheral device;

transmitting an abort command from the host computer to the peripheral device in response to said notification; and in response to said abort command from said host computer, deleting all queued commands within the command queue.

10. The method of claim 9 wherein the step of transmitting a notification to the host computer further includes the steps of:

configuring at the peripheral device a machine exception status parameter to identify the failed command;

configuring at the peripheral device the machine exception status parameter to indicate the suspension of the execution of commands within the command queue of the peripheral device; and transmitting the machine exception status parameter to the host computer from the peripheral device.

11. The method of claim 9 further comprising the step of recovering user data from the data buffer in the peripheral device.

12. The method of claim 11, further comprising the steps of:

terminating queued commands within the command queue; and actuating the execution of commands by the command queue in response to commands received from the host computer subsequent to terminating of queued commands.

13. A method for suspending the operation of a media recording peripheral device to preserve information within a data buffer of a peripheral device having a command queue upon detection of an error condition at the peripheral device, comprising the steps of:

detecting at the peripheral device a command error within the command queue of the peripheral device;

terminating by the peripheral device a command within the command queue causing the command error;

suspending by the peripheral device execution of commands within the command queue of the peripheral device;

transmitting a notification from the peripheral device to a host computer of the command error within the command queue and the suspension of execution of commands within the command queue of the peripheral device;

recovering information from the data buffer of the peripheral device;

terminating queued commands within the command queue of the peripheral device;

transmitting an abort command from the host computer to the peripheral device in response to said notification; and in response to said abort command from said host computer, deleting all queued commands within the command queue; and actuating at the peripheral device the execution of commands in the command queue in response to commands received from the host computer subsequent to termination of queued commands.

14. The method of claim 13, wherein the step of detecting a command error further comprises the step of detecting a write error.

15. The method of claim 13, wherein the step of detecting a command error further comprises the step of detecting a read error.

16. The method of claim 13, wherein the step of detecting a command error further comprises the step of detecting a non-data error.

* * * * *